United States Patent [19]

Rao

[11] 4,110,646

[45] Aug. 29, 1978

[54] AC SYNCHRONOUS MOTOR HAVING AN AXIALLY LAMINATED ROTOR

[75] Inventor: S. Chandrasekhara Rao, Fairlawn, N.J.

[73] Assignee: Bogue Electric Manufacturing Company, Paterson, N.J.

[21] Appl. No.: 730,260

[22] Filed: Oct. 5, 1976

[51] Int. Cl.² .......................................... H02K 19/00
[52] U.S. Cl. .................................. 310/163; 310/156; 310/265
[58] Field of Search ............... 310/162, 163, 164, 156, 310/165, 261, 262, 264, 265, 211, 269, 166

[56] References Cited

U.S. PATENT DOCUMENTS

| | | | |
|---|---|---|---|
| 2,913,607 | 11/1959 | Douglas | 310/162 |
| 2,939,025 | 5/1960 | Williford | 310/163 |
| 2,975,310 | 3/1961 | Armstrong | 310/163 |
| 2,989,655 | 6/1961 | Honsinger | 310/162 |
| 3,045,135 | 7/1962 | Honsinger | 310/162 |
| 3,126,493 | 3/1964 | Honsinger | 310/156 |
| 3,210,584 | 10/1965 | Jorgensen | 310/162 |
| 3,721,844 | 3/1973 | Fong | 310/162 |

FOREIGN PATENT DOCUMENTS

| | | | |
|---|---|---|---|
| 871,183 | 4/1953 | Fed. Rep. of Germany | 310/162 |
| 470,794 | 5/1969 | Switzerland | 310/162 |

Primary Examiner—R. Skudy
Attorney, Agent, or Firm—Carella, Bain, Gilfillian & Rhodes

[57] ABSTRACT

An improved AC synchronous reluctance motor including a plurality of rotor segments wherein each rotor segment is comprised of a plurality of magnetic sub-segments and a plurality of electrically conductive sub-segments interspersed with said magnetic sub-segments and wherein each magnetic sub-segment is comprised of a plurality of laminations of soft magnetic material extending axially parallel to the axis of the shaft and non-magnetic material extending axially parallel to the axis of the shaft and positioned intermediate the laminations of soft magnetic material.

4 Claims, 3 Drawing Figures

ROTOR ORIENTATION ILLUSTRATING INCREASED QUADRATURE AXIS RELUCTANCE

ROTOR ORIENTATION ILLUSTRATING DECREASED DIRECT AXIS RELUCTANCE

AC SYNCHRONOUS MOTOR HAVING AN AXIALLY LAMINATED ROTOR

BACKGROUND OF THE INVENTION

Many differently constructed ac synchronrous reluctance motors are known to the prior art and such motors are provided with differently structured rotors for enchancing or improving various characteristics of the motor such as torque, efficiency and power factor.

More specifically, and known to those skilled in the ac synchronous reluctance motor art, prior art ac synchronous reluctance motors have been constructed utilizing rotors which are assembled from a plurality of radial laminations stacked axially; an example of such prior art is disclosed in U.S. Pat. No. 3,210,584. In addition, prior art ac synchronous reluctance motors have been constructed having rotors which are comprised of magnetic segments interspersed with electrical conductors; an example of such prior art is disclosed in Swiss Patentschrift No. 470,794 and Canadian Patent No. 629,152.

While many prior art ac synchronous reluctance motors operate adequately for various known purposes, it will be understood by those skilled in the art that an improvement in various characteristics, such as for example torque, efficiency and power factor, will provide an improved ac synchronous reluctance motor having greater and more desirable utility for many purposes.

Accordingly, it is the primary object of the present invention to provide an improved ac synchronous reluctance motor having improved starting torque, pull-in torque, pull-out torque, efficiency and power factor characteristics.

SUMMARY OF THE INVENTION

The improved ac synchronous reluctance motor of the present invention provides improved starting torque, pull-in torque, pull-out torque, efficiency and power factor characteristics. As is known to those skilled in the art, the torque developed by an ac synchronous reluctance motor depends upon or is directly related to the ratio of the direct axis reactance to the quadrature axis reactance. Accordingly, the improved ac synchronous reluctance motor of the present invention provides increased pull-in and pull-out torque by providing a rotor having magnetic means or segments comprised of soft magnetic material interspersed with non-magnetic material. The laminated magnetic means or segments provide an increased quadrature axis reluctance which decreases the quadrature axis reactance whereby the ratio of the direct axis reactance to the quadrature axis reactance is increased and the pull-in and pull-out torque developed by the motor is increased. Also, the efficiency and power factor of the motor are increased.

DESCRIPTION OF THE INVENTION

Figure 1:
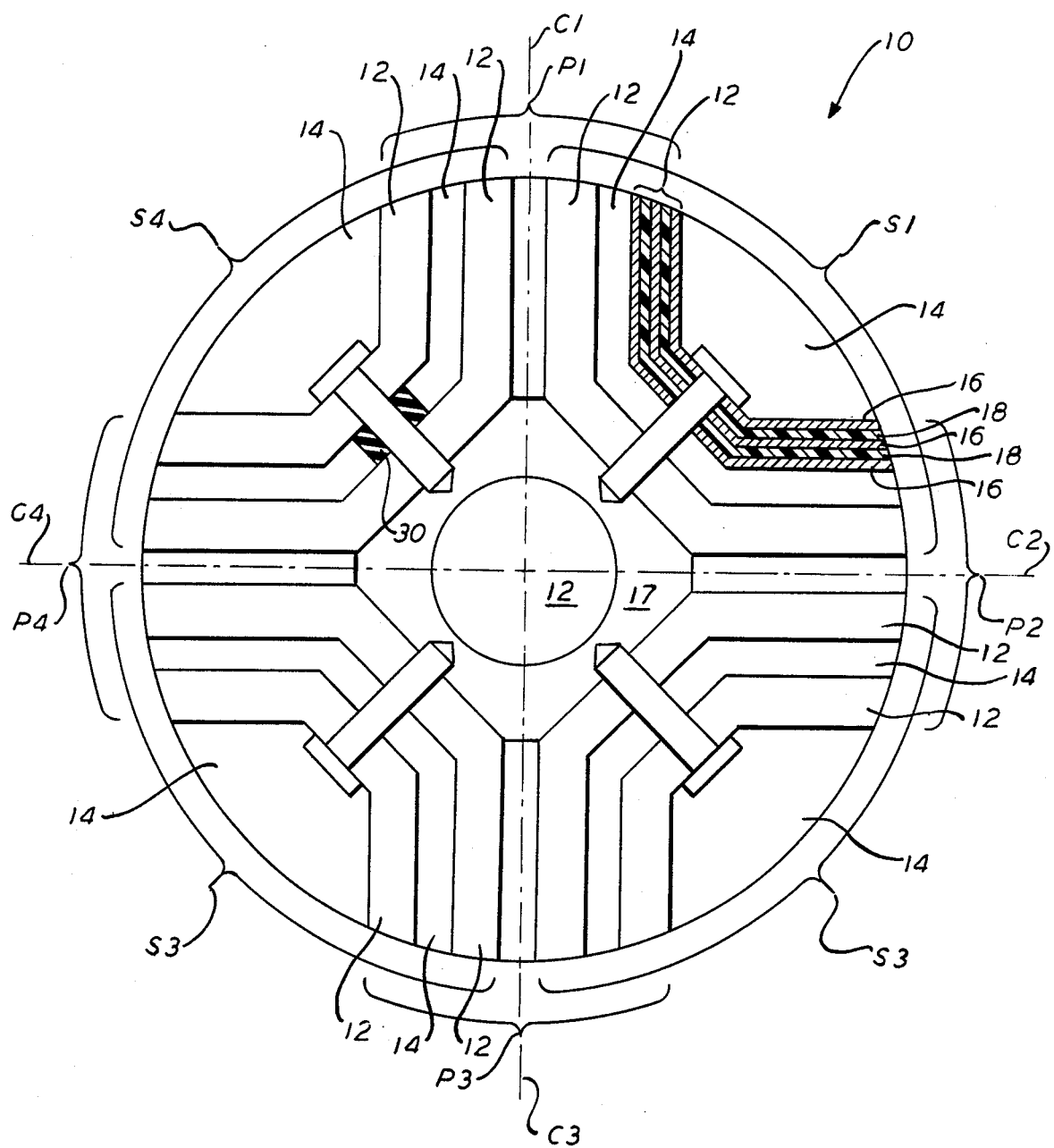
FIG. 1 is a diagrammatic cross-sectional view of the rotor of the improved ac synchronous reluctance motor of the present invention.

Referring now to FIG. 1, there is illustrated diagrammatically an embodiment of the improved ac synchronous reluctance motor of the present invention including the rotor indicated by general numerical designation 10. As is known to those skilled in the art, the rotor 10 may include a central shaft 12 along its axis of rotation and may have a plurality of even-numbered rotor poles which rotor poles are indicated schematically by circumferentially bracketed portions P-1, P-2, P-3, and P-4. Each rotor pole has a pole center indicated generally and schematically as C-1, C-2, C-3 and C-4.

In accordance with the teaching of the present invention the improved ac synchronous reluctance motor and in particular the improved rotor 10 may comprise a plurality of rotor segments indicated generally, by circumferentially bracketed portions S-1, S-2, S-3 and S-4, and which plurality of rotor segments extend axially parallel to the axis of rotation and wherein each of the rotor segments extends angularly from a pole center to an adjacent pole center and wherein each of the rotor segments comprises one-half of adjacent rotor poles. More specifically, and by way of example, rotor segment S-1 extends angularly from pole center P-1 to pole center P-2 and adjacent portions of adjacent rotor segments S-1 and S-2 comprises one-half of rotor pole P-2 as shown in FIG. 1.

Each of the rotor segments is comprised of a plurality of magnetic sub-segments 12 and a plurality of electrically conductive sub-segments 14 interspersed with the magnetic sub-segments 12. As will be understood specifically with regard to magnetic sub-segments 12 illustrated schematically in detail with regard to rotor segment S-1, each magnetic sub-segment 12 is comprised of a plurality of laminations of soft magnetic material 16 and non-magnetic material 18 intermediate the laminations of soft magnetic material 16. The magnetic sub-segments 12 and the electrically conductive sub-segments 14, and the plurality of laminations of soft magnetic material 16 and non-magnetic material 18, are shaped complementarily to the rotor segments S-1, S-2, S-3 and S-4.

Figure 2:
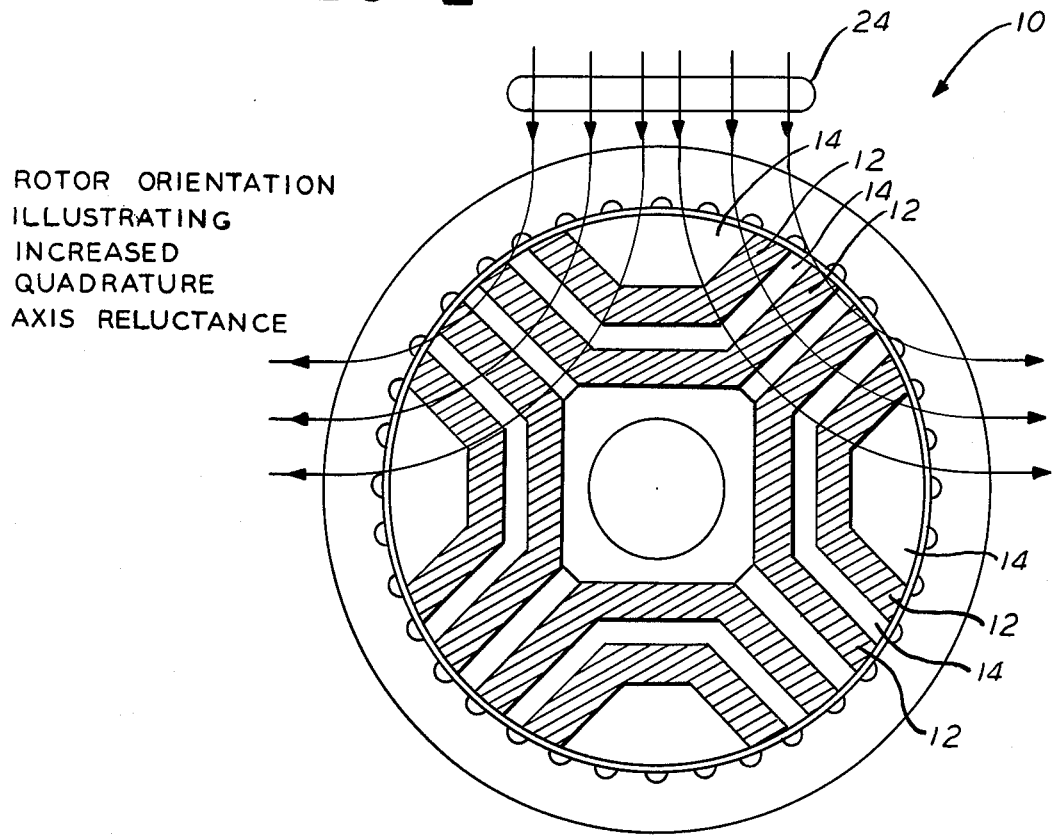
FIGS. 2 qnd 3 are diagrammatic cross-sectional views illustrating, inter alia, the quadrature axis and direct axis reluctance paths, respectively, provided by the rotor of the improved ac synchronous reluctance motor of the present invention.
Figure 3:
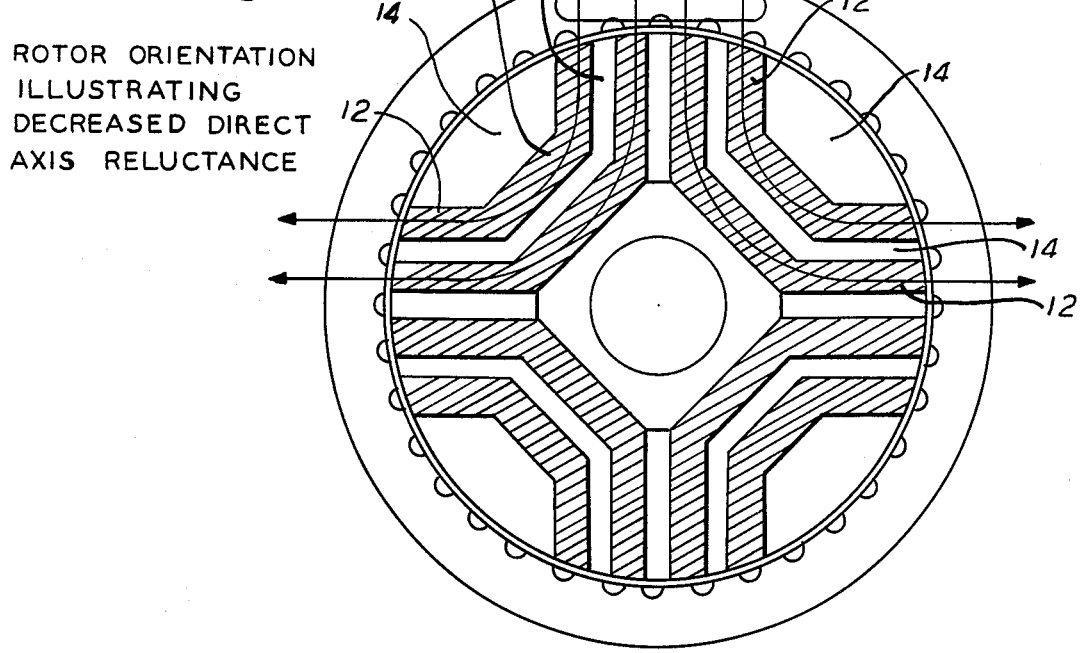

Referring now to FIGS. 2 and 3, the manner in which the magnetic sub-segments 12 of the present invention provide increased quadrature axis reluctance thereby decreasing quadrature axis reactance whereby the ratio of the direct axis reactance to the quadrature axis reactance is increased and the pull-in torque, pull-out torque, power factor and efficiency of the ac synchronous motor of the present invention are improved, will be set forth in detail.

In particular, it will be understood by those skilled in the art that FIG. 2 illustrates an ac synchronous reluctance motor embodying the present invention with the rotor 10 in an orientation illustrating the flux paths corresponding to the quadrature axis reluctance. It will be noted that the structure of the magnetic sub-segments 12 have not been shown in detail in FIG. 2 for reasons of clarity, but it will be understood that FIG. 2 is intended to illustrate the rotor 10 of FIG. 1 having magnetic sub-segments 12 including the laminations of soft magnetic material 16 and the non-magnetic material 18 interspersed with the laminations of soft magnetic material 16 as shown in detail in FIG. 1.

It will be noted that from FIG. 2 that the lines of magnetic flux 24 associated with the quadrature axis reluctance must pass across and through the magnetic-subsegments 12 and, in so doing, the lines of flux 24 in passing across the rotor 10 must traverse the non-magnetic material 18 interspersed between the laminations of soft magnetic material 16. Because of this, the quadrature axis reluctance is substantially increased beyond that provided by the rotors known to the prior art due to the presence of the non-magnetic material 18 in the path of the magnetic flux 24.

Referring now to FIG. 3, the rotor 10 is oriented so as to illustrate the magnetic paths corresponding to direct axis reluctance. As with regard to FIG. 2, for reasons of clarity, the laminated structure of the magnetic sub-segments 12 is not shown in detail but it will be also understood that FIG. 3 illustrates the rotor 10 of FIG. 1 having the laminated magnetic sub-segments 12 comprised of laminations of soft magnetic material 16 interspersed with non-magnetic material 18. From FIG. 3, it will be understood that the lines of magnetic flux 26 relating or corresponding to direct axis reluctance, upon entering the rotor 10 pass into and through the individual laminations of soft magnetic material 16 of the magnetic sub-segments 12 without having to traverse any of the non-magnetic material 16. Thus, in the way of the example, a particular flux line 26 enters a particular soft magnetic lamination 16 at one of the poles and exits the same lamination of soft magnetic material at the pole of opposing polarity.

Accordingly, it will be understood by those skilled in the art, that while the laminated structure of the magnetic subsegments 12 may slightly increase the direct axis reluctance by virtue of the reduced cross-sectional area of the laminations of soft magnetic material 16 available to the magnetic path which determines direct axis reluctance, the effect of the laminated magnetic-subsegments 12 is not nearly so great on the direct axis reactance as is its effect on the quadrature axis reluctance and, indeed, the effect of the magnetic sub-segments 12 on the direct axis reluctance is insubstantial. Further, it will be understood that in accordance with the teachings of the present invention the direct axis reluctance can be further reduced by using grain oriented steel as the magnetic material. This advantage, however, can be obtained only in a rotor construction as described herein with axial laminations rather than radial as known to the prior art.

In brief summary, it will be understood that FIGS. 2 and 3 together show, comparatively, the dependence of both direct axis reluctance and quadrature axis reluctance upon the laminated structure of the magnetic sub-segments 12 and further show that the ratio of quadrature axis reluctance to direct axis reluctance, which in turn is determinative of the ratio of direct axis reactance to quadrature axis reactance is increased by virture of the laminated magnetic sub-segments 12.

Referring again to FIG. 1, it will be further understood by those skilled in the art that while the rotor 10 of the present invention is illustrated in FIG. 1 is, of course, a four pole rotor, ac synchronous motors and rotors embodying the present invention may be of other even-numbered poles. Further, it will be understood that the electrically conductive sub-segments 14 and the non-magnetic material 18 of the magnetic sub-segments 12 may be, for example, copper or aluminum, and that the laminations of soft magnetic material 16 of the magnetic sub-segments 12 may be, for example, of suitable iron or iron alloy or steel.

It will be further understood, and in accordance with the teachings of the present invention, in constructing the rotor 10 the laminations of soft magnetic material 16 may be provided by sheets of suitable material as taught above suitably bent into shape having substantially U-shaped cross-sectional configuration as shown. The non-magnetic material 18 may be similarly provided by sheets of materials as taught above, also suitably bent into the substantially U-shaped cross-sectional configuration as shown, and the soft magnetic material 16 and the non-magnetic material 18 may be then assembled in alternating sequence as shown and suitably secured to a hub 17, which in turn may be suitably secured to the shaft 12, such as for example by bolts as shown. The assembly may be then cast in or fabricated with suitable conductive material such as for example copper or aluminum, to fill the interspaces between the laminated magnetic sub-segments 12 and thereby provide the electrically conductive sub-segments 14 and end rings (not shown) connecting the electrically conductive sub-segments 14.

It will be further understood by those skilled in the art that in accordance with the further teachings of the present invention various characteristics of rotor 10 may be further enhanced such as the useful asynchronous torque produced, i.e., the starting torque and the pull-in torque. More specifically, an ac synchronous motor and rotor embodying in the present invention may include, as shown in FIG. 1, with regard to rotor segment S-4, a length of axially extending non-magnetic material 30 which interrupts the electrically conductive sub-segments 14 from pole to pole thereby causing current induced in the electrically conductive sub-segments 14 to flow axially parallel to the axis of rotation of the rotor 10 thereby producing enhanced useful asynchronous torque, i.e., starting torque and pull-in torque.

It will be still further understood by those skilled in the art, that in accordance with the further teachings of the present invention, the geometry of the electrically conductive sub-segments 14 may be optimized to obtain desired starting torque and in-rush current characteristics. More specifically, it will be understood that by predetermining or varying the ratio of the radial depth to the circumferential width of the electrically conductive sub-segments 14 such electrically conductive sub-segments 14 may be caused to have a high effective resistivity for enhancing starting torque and be made to have a lower effective resistivity upon the motor approaching synchronism so as to provide enhanced pull-in torque due to deeper flux penetration into the rotor provided by such predetermined ratio.

It will be further understood by those skilled in the art that many variations and modifications may be made in the present invention without departing from the spirit and the scope thereof.

What is claimed is:

1. In an ac synchronous reluctance motor provided with a rotor having a central shaft along its axis of rotation and having a plurality of even-numbered rotor poles with each rotor pole having a pole center, wherein the pull-in torque, pull-out torque, power factor and efficiency of the motor are related to the ratio of direct axis reactance to the quadrature axis reactance of the motor, said ratio being predetermined for each such motor, the improvement comprising:

(a) a plurality of rotor segments with each rotor segment extending axially parallel to said axis of rotation and extending angularly from a pole center to an adjacent center and adjacent portions of adjacent rotor segments comprising one-half of a rotor pole;
(b) each of said rotor segments comprised of
  (i) a plurality of magnetic sub-segments, and
  (ii) a plurality of electrically conductive sub-segments interspersed with said magnetic sub-segments;
(c) each of said magnetic sub-segments comprised of
  (i) a plurality of laminations of soft magnetic material extending axially parallel to the axis of said shaft, and
  (ii) non-magnetic material extending axially parallel to the axis of said shaft and positioned intermediate the laminations of soft magnetic material,
(d) said laminations of soft magnetic material of said magnetic sub-segments providing decreased direct axis reluctance thereby increasing the direct axis reactance and said non-magnetic material of said magnetic sub-segments providing increased quadrature reluctance thereby decreasing quadrature axis reactance whereby the ratio of direct axis reactance to quadrature axis reactance is increased and the pull-in torque, pull-out torque, power factor and efficiency of the ac synchronous reluctance motor are improved.

2. An ac synchronous reluctance motor according to claim 1 wherein said plurality of laminations of soft magnetic material and said non-magnetic material have a generally U-shaped cross-sectional configuration when viewed in a plane extending transverse to and perpendicular to said shaft.

3. In an ac synchronous reluctance motor of the type having a rotor including:
(a) a central shaft along its axis of rotation;
(b) magnetic means for developing a synchronous torque in response to an externally generated rotating magnetic field under conditions of rotor rotation speed equal to rotation speed of the externally generated magnetic field;
(c) electrical conductor means for developing a starting torque under conditions of rotor rotation speed different from the rotation speed of the externally generated magnetic field; and
(d) wherein the pull-in torque, pull-out torque, power factor and efficiency of the motor are related to the ratio of direct axis reactance to the quadrature axis reactance of the motor, said ratio being predetermined for each such motor;
wherein the magnetic means comprise
(e) at least two sheets of soft magnetic material extending axially and parallel to the axis of said shaft;
(f) a sheet of non-magnetic material extending axially parallel to the axis of said shaft and positioned intermediate said sheets of soft magnetic material;
(g) said sheets of soft magnetic material and non-magnetic material being secured together and to said shaft to form said magnetic means; and (h) said sheets of soft magnetic material decreasing said direct axis reluctance thereby increasing said direct axis reactance whereby the ratio of direct axis reactance to quadrature axis reactance is increased and the pull-in torque, pull-out torque, power factor and efficiency of the motor are improved.

4. An ac synchronous reluctance motor according to claim 3 wherein said sheets of soft magnetic material and non-magnetic material have a generally U-shaped cross-sectional configuration when viewed in a plane transverse and perpendicular to said shaft.

* * * * *